Figure 1:
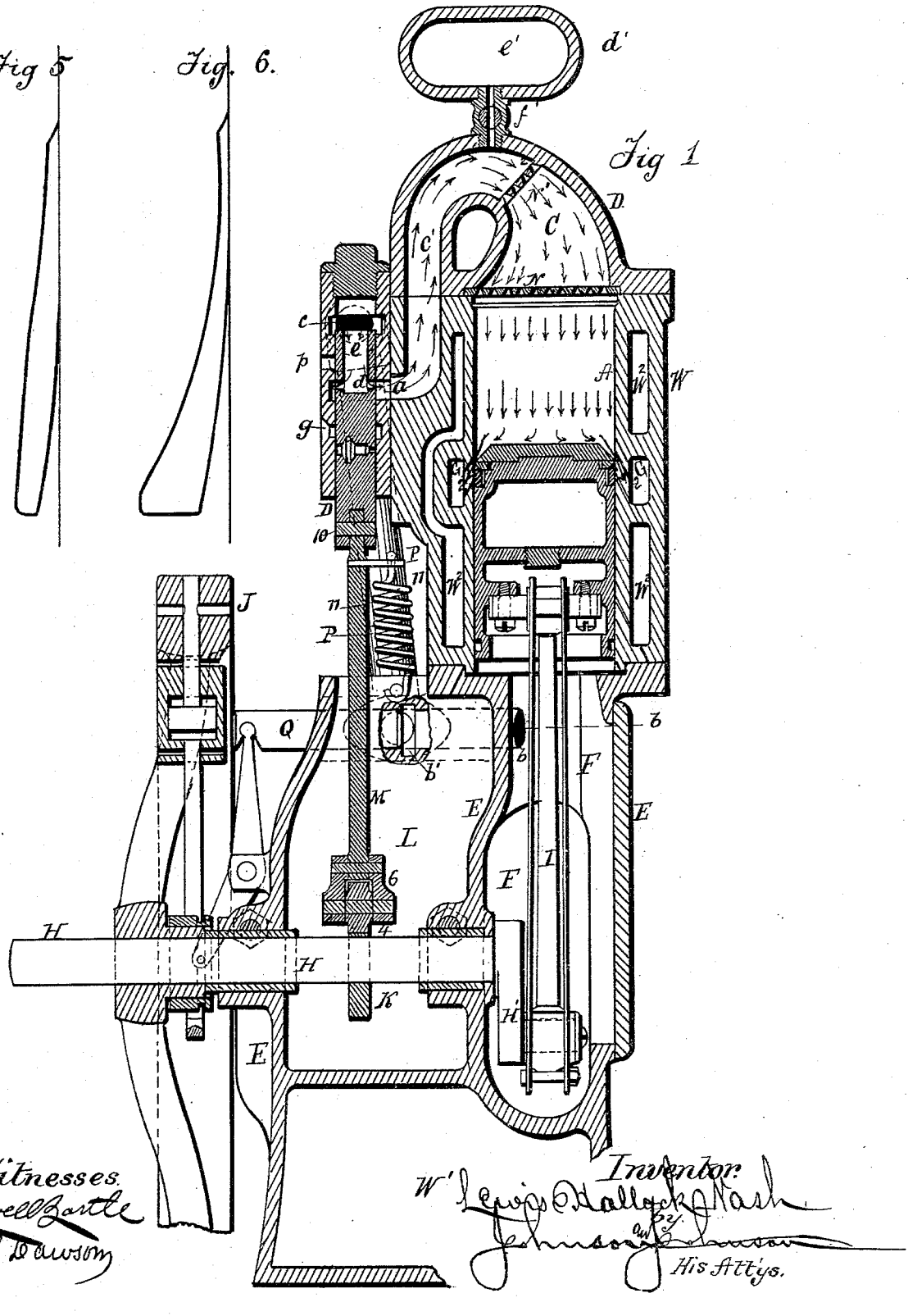

(No Model.)  L. H. NASH.  3 Sheets—Sheet 1.
GAS ENGINE.

No. 401,453.  Patented Apr. 16, 1889.

Witnesses
Howell Bartle
J. S. Dawson

Inventor
Lewis Hallock Nash
by Johnson & Johnson
His Att'ys.

(No Model.) 3 Sheets—Sheet 2.
L. H. NASH.
GAS ENGINE.
No. 401,453. Patented Apr. 16, 1889.
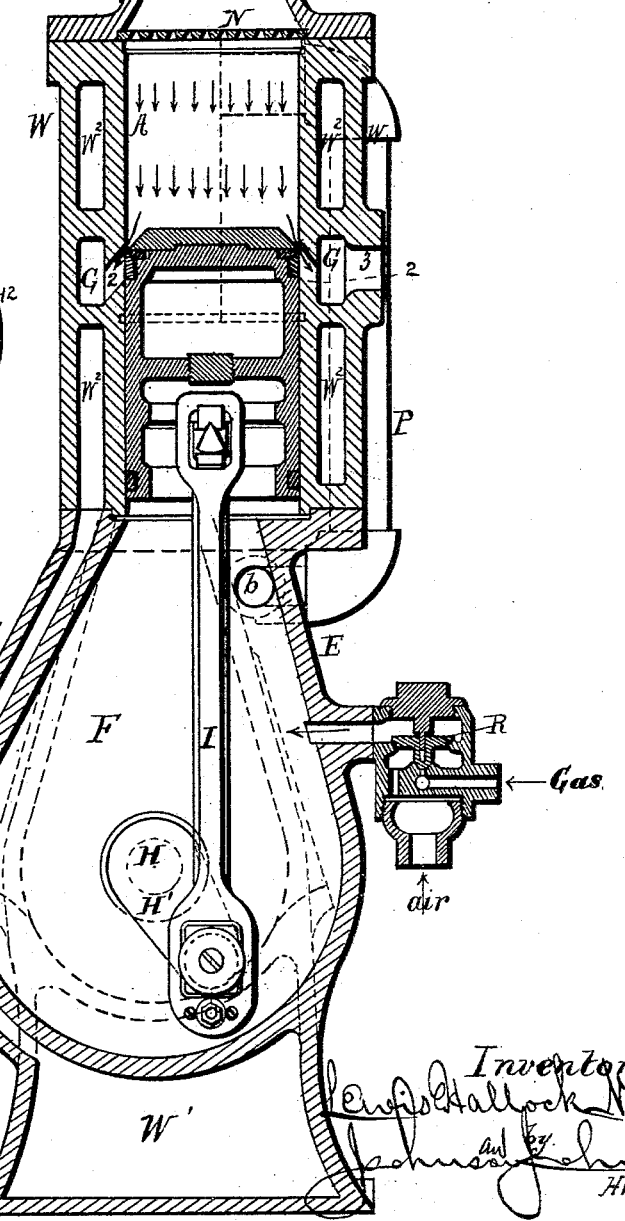
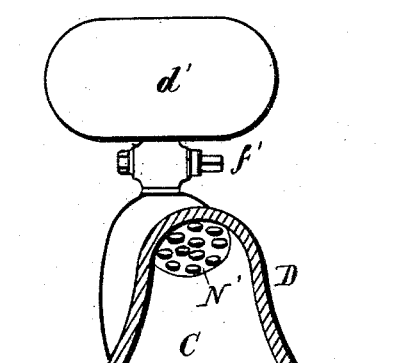
Fig. 2
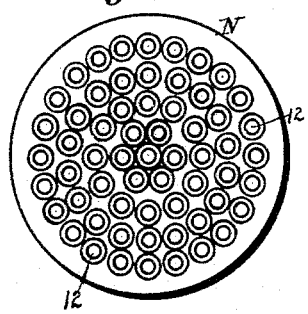
Fig. 3.
Witnesses:
Inventor (No Model.) 3 Sheets—Sheet 3.
L. H. NASH.
GAS ENGINE.
No. 401,453. Patented Apr. 16, 1889.
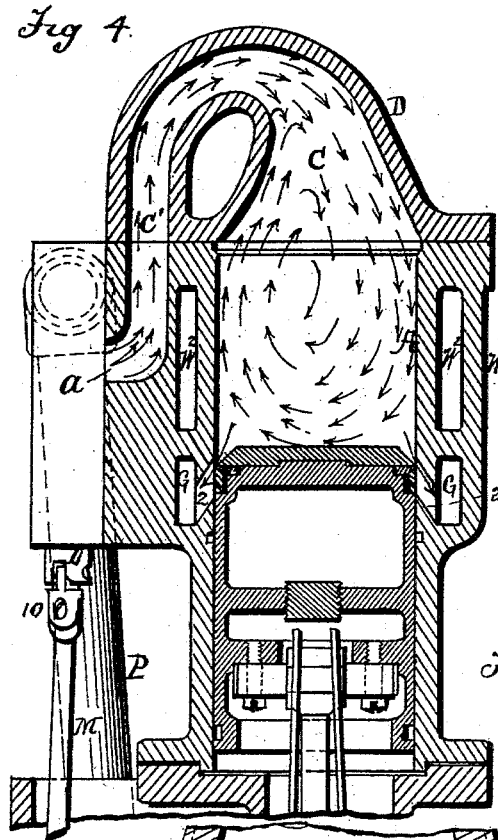
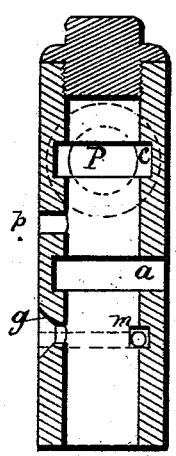
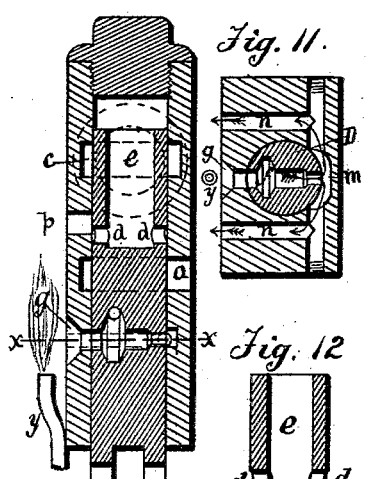
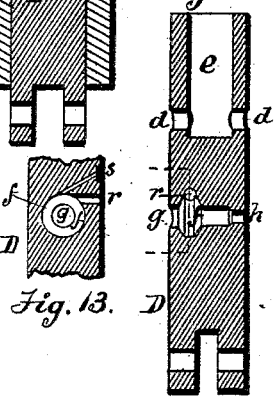
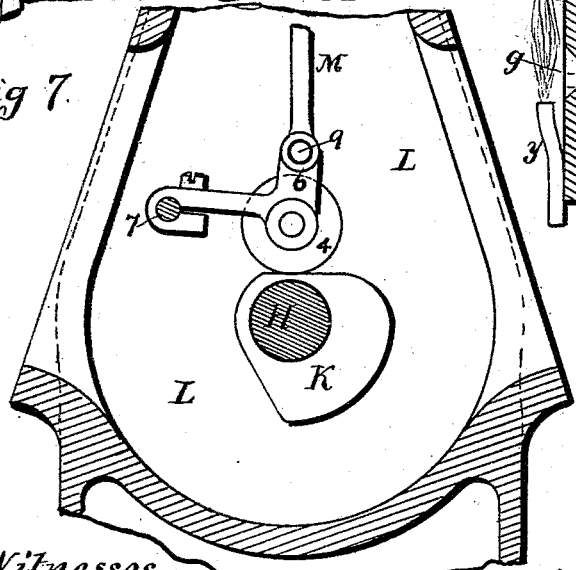
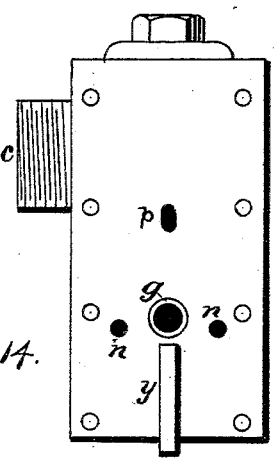
Witnesses.
Nowell Bartle
J. S. Dawson
Inventor
Lewis Hallock Nash
by Johnson & Johnson
His Attys.

UNITED STATES PATENT OFFICE.

LEWIS HALLOCK NASH, OF SOUTH NORWALK, CONNECTICUT, ASSIGNOR TO THE NATIONAL METER COMPANY, OF NEW YORK, N. Y.

GAS-ENGINE.

SPECIFICATION forming part of Letters Patent No. 401,453, dated April 16, 1889.

Application filed June 22, 1888. Serial No. 277,875. (No model.)

*To all whom it may concern:*

Be it known that I, LEWIS HALLOCK NASH, a citizen of the United States, residing at South Norwalk, in the county of Fairfield and State of Connecticut, have invented certain new and useful Improvements in Gas-Engines; and I do hereby declare the following to be a full, clear, and exact description of the invention, such as will enable others skilled in the art to which it appertains to make and use the same.

My invention is directed to the improvement of that class of gas-engines in which the combustible-mixture is introduced into the power-cylinder while the waste gases are escaping, whereby the former acts to drive the latter before it; and the objects of my invention are to prevent the incoming charge from becoming mixed with the escaping waste products, to facilitate the starting of the engine, to promote the efficiency of the lighter valve, and to reduce the friction of the valve-operating connections, and other features particularly pointed out in the specification and claim.

In gas-engines in which the waste gases are expelled from the combustion-chamber by the inflowing charge the valve-ports are of necessity very small as compared with the area of the combustion-chamber, and hence the charge issues from said ports with a high velocity in jet-currents, which enter the combustion-chamber and circulate around it, so as to mix with the charge of waste gases therein contained. It has been attempted to avoid this by making the passage leading from the valve to the combustion-chamber of a curved section gradually enlarging from the valve to the cylinder under the supposition that the gases will expand and fill the enlarging passage in a uniform flowing volume. I have found by experiment that the desired result cannot be obtained by this means, since the gases once having a high velocity imparted to them will circulate around the walls of the combustion-chamber, mixing with the waste gases to an injurious extent.

As a means of preventing the gases of the new charge from flowing directly to and out of the exhaust and from mingling with and being diluted by the spent gases in the power-cylinder the latter has been provided with a series of transverse deflector-plates arranged to present a step-like form of surfaces across the cylinder backward into the channel or passage through which the gaseous mixture passes to the power-cylinder, the said inlet-passage being at right angles to the said plates, so that as the mixture rushes upward through the passage it will strike successively the edges of the various transverse plates, and first one portion and then another of the mixture will be deflected and thrown outward across the area of the cylinder, reducing the speed with which the charge will be thrown inward toward the exhaust and creating eddies and counter-currents under the supposition that such eddies tend to retain the charge in the rear of the cylinder and prevent any portion thereof from being projected through the spent gases to the exhaust. This, however, is not the fact. The essential feature of this plan is the arrangement of the series of deflector-plates so that each will project into the inlet-port in parallel relation to each other, so that a portion of each plate of the series will first act to throw the gases outward from the cylinder at right angles to the inlet, and then directing it in eddies and counter-currents into the cylinder through the spaces between said deflectors. The necessary effect of the eddies and counter-currents produced by said plates is to mix up the fresh charge with the foul gases of the preceding charge and to defeat the very object which I have in view in employing a perforated partition.

My improvement provides for retarding and expanding the flow of the gaseous currents within the combustion-chamber by interrupting its continuous flow and directing the gases in parallel currents of uniform velocity through the power-cylinder by means of one or more partition-plates having perforations and placed either at the end of and within said passage or in said cylinder, and thus carry the volume of the waste gases before them without eddy-currents, said plates extending entirely across said passage or cylinder. In this way the perforated partition-plates will redirect the flow from currents moving in circular and eddying paths to currents moving in direct parallel lines within the power-cylinder without eddies and counter-currents, which would defeat the object of my improvement. In like manner these perforated plates receive the flame from the gas-inlet port in its curved path and diffuse it from the combustion-chamber in uniform parallel lines into the power-cylinder, and thus render the combustion complete and obtain its full explosive force. In this particular the employment of the perforated plates with the ignitor-valve gives important advantages. These and other features of my invention for carrying out the objects of my improvements I will now proceed to describe in connection with the drawings, in which—

Figure 1 represents a vertical section of my improved gas-engine. Fig. 2 represents a similar section taken centrally through the power-cylinder at right angles to Fig. 1. Fig. 3 shows the under side of the perforated partition of the combustion-chamber, by which the currents entering the latter are retarded, expanded, and directed from curved paths in parallel lines into the cylinder. Fig. 4 shows the power-cylinder in vertical section as used with an enlarging passage for the inflow, in which the arrows illustrate the moving jet-currents of the charge, so as to mix with the escaping waste gases when my improvement is not used. Figs. 5 and 6 show power cards or diagrams taken from the engine operating under the conditions in which the charge is mixed, and is not mixed with the escaping waste gases, as will be hereinafter explained. Fig. 7 shows the valve-operating mechanism. Fig. 8 shows the valve-case in section. Figs. 9 and 10 show the valve and case in sectional views, the valve being in different positions. Fig. 11 is a cross-section of the valve and its case on the line $x$ of Fig. 9. Fig. 12 shows the valve in section, and Fig. 13 a cross-section thereof through the ignition-chamber and supply-passages; and Fig. 14 represents the valve-case in elevation, showing the ignition and escape ports.

The engine shown is of the vertical type, and the power-cylinder A is surrounded by a cooling-jacket, W. The combustion-chamber C is formed in a separate hood, D, which opens into the power-cylinder and communicates at one side of the latter with the supply valve-port. The forward end of the power-cylinder opens into a casing, E, of the frame, which forms a compression supply-chamber, F, for the engine, of which the piston is the compressor. The term "power-chamber" may properly be used to apply not only to the cylinder A, but also the horn-shaped passage C C', since the combustion and expansion of the gases occur in all of them. An exhaust-passage, G, is formed by the jacket around the cylinder and opens into the chamber of the latter by a series of ports, 2, at about the middle of the length of the cylinder, and the jacket has one or more outlet-ports, 3, for the escape of the gases, as seen in Fig. 2.

The power-transmitting crank-shaft H is mounted in the engine-casing E, so that its crank H' and the piston-connections I of the latter are inclosed and operate within the supply compression-chamber.

The fly-wheel J is secured upon the crank-shaft outside of the casing, and the supply-valve-operating eccentric K is secured upon said shaft within a chamber, L, of the casing, within which the valve-connecting rod M also operates, so that the piston and valve operating parts are inclosed to prevent the splashing of the lubricant.

The combustion-chamber is contracted and has somewhat the form of a curved horn, the smaller end, C', communicating with the supply-port $a$ of a valve, D, which forms both the supply and the ignition valve, while the larger end of said combustion-chamber opens into the power-cylinder, so that the supply enters centrally the combustion-chamber in a returning direction to the inflow, and the flame for the ignition of the charge follows in the same direction from the same valve, which is arranged at the side of the cylinder.

The compression-chamber F communicates by a passage, $b$, with a pipe, P, which opens into the valve-chamber port $c$, and such communication is controlled by a governor-valve, Q, fitted into said passage $b$, so as to open and to close the port $b'$ of the passage $b$ to increase or to diminish the flow of the charge under the action of governor. This valve Q serves to permit the flow of a certain quantity of the combustible mixture to form the charge and to retain the surplus mixture within the compression-chamber, and such function is controlled by the governor.

The valve seen in Fig. 12 is of cylindrical form, and has inlet-ports $d\ d$, which open into a central passage, $e$, a central port, $g$, which communicates with the external lighter, $y$, a central escape-port, $h$, which communicates with a case-port in the operation of the valve, a supply-port, $s$, and an ignition-port, $r$, which opens tangentially into the circular ignition-chamber $f$, as shown in Fig. 13. The valve-case shown in Fig. 8 has a supply-port, $c$, which communicates through the pipe P with the compression-chamber F of the engine, a port, $a$, communicating with the power-cylinder, an ignition-port, $g$, opening to the external lighter, an escape-port, $m$, which communicates with the outer air through the passages $n$, Fig. 11, and an escape-port, $p$, through the case-wall.

The device for operating the valve is best seen in Fig. 7; and it consists of a cam, K, secured to the crank-shaft H, a roller, 4, carried by an L rocker-arm, 6, pivoted to the engine-frame by the pin 7, and by the pin 9 to the valve-rod M, which latter is connected to the lower end of the valve D by the pin 10. A spring, 11, is secured at either end to the rod M and to the engine-frame, so that it will constantly tend to hold the valve-connections down upon the cam and to move the valve downward, while its upstroke is effected by the cam.

I have shown in Fig. 4 by arrows the manner in which the charge enters and circulates in contact with the combustion-chamber walls, so as to mix to a large extent with the outflowing waste gases, while in Figs. 1 and 2 I have shown means for preventing such mixing, which consists of one or more perforated plates, N, placed across the path of the entering charge, so as to retard the volume of the charge and cause it to spread out over the surface of the plate and to flow through all the holes, and thus have parallel lines of direction imparted to it as it leaves the diffusing and retarding plate or plates. I prefer to place one of these perforated plates at the junction of the power-cylinder with the combustion-chamber and another, N', in the valve-connecting passage C' of the combustion-chamber. I prefer to make the perforations 12 flaring in the direction of the flow, the better to diffuse the flow within the cylinder and to give it free passage through the holes. The action of these non-mixing plates is as follows: The charge entering through the valve with a high velocity tends to cling to the concave surfaces of the chamber or passage, as shown by the arrows in Fig. 1, and, meeting the perforated partition N', the volume is slightly retarded in its motion, spreading out over the entire surface of the plate, the eddies are broken up, and the volume passes through the holes, the flaring form of which causes the currents to unite in a larger volume with a more uniform flow. Meeting the second partition plate, N, the volume or currents again spread over its perforated surface, breaking up the eddies, and passing through the holes 12 into the cylinder, wherein the currents unite in a flowing stream or volume in parallel lines and drive out the waste gases before them without mixing therewith. It will be understood that the receiving-surfaces of these partition-plates are preferably unbroken—that is, they are flat—and that the size of the perforations must be such as to permit the free passage of the gases and the flame through them from the combustion-chamber into the cylinder; and while I prefer to make the partition of a plate so that its perforations and solid surface parts will be about equal area, so as to give the retarding and expanding action of the gases flowing upon them, yet partitions of wire-netting or other suitable material may be used. As the supply-valve forms also the ignitor-valve, and the expanding supply-passage forms also the ignitor-flame passage, the flame is caused to expand and be diffused in its curved path by contact with the perforated partition-plates and to enter the charge in the power-cylinder in parallel lines, producing complete combustion and obtaining the full force and effect of such explosion by giving a uniform and instantaneous ignition to the volume of gases within the power-cylinder. These three things, therefore—viz., the valve D, the supply-passage having the form of a curved horn, and the perforated partition-plates—co-operate to produce improved results in supplying and igniting the charge.

It will be observed that the use of a plurality of perforated partitions in the power-chamber A C divides such chamber into a series of separate chambers. The object which I have in view and the purposes effected by such division may be briefly described as follows: The gas entering the chamber C' is arrested or checked by the first partition, and the eddies expend themselves, in circulating around said chamber, and are thus neutralized or composed, so that the gas is prepared to flow through said partition in direct lines, not by the action or reaction of the jet-currents, but by the difference of pressure present in the chambers, C and C'. The gas in the chamber C' is caused to flow through the partition N' solely by the differences of pressure in said chambers, and it therefore passes said partition in an easy and even flow, because the difference of pressures is not very great. The same is true of the passages of said gases through the chamber C, so that the gas enters the chamber A not only in direct lines, but in an easy and even flow, free from jets and eddies, and upon the principle of statics, as distinguished from the principle of dynamics or impact.

The advantageous results of this improvement are best seen by referring to the pressure-cards shown in Figs. 5 and 6, in which Fig. 5 shows a card taken from an engine in which the inflowing charge is caused to mix with the escaping products of combustion, as seen in Fig. 4, while Fig. 6 shows a card taken from the same engine having one non-mixing perforated plate. (Seen in Figs. 1 and 2.) A comparison of these pressure diagrams will show that there is a gain in power of nearly twenty per cent. by the use of a retarding-partition. By employing both the partitions shown in Fig. 1 I have ascertained by experiment that there is a gain in favor of nearly fifty per cent. I have shown the passage conveying the charge to the power-cylinder as being in the form of a curved horn; but it is not necessary to so form it when the retarding-partition is used, as the latter acts to control the flow without regard to the shape of the connecting-passages; but the form shown is preferred.

To facilitate the starting of the engine, I provide a reservoir, $d'$, which communicates with the combustion-chamber through a passage controlled by a valve, $f'$. I prefer to place this reservoir at the top of the inflowing-charge passage and connect it with the latter by a pipe, in which the valve $f'$ is placed. When the engine is being started, the fly-wheel is turned by hand, which causes the charge to be drawn into the compression-chamber F, wherein the charge is compressed by the back-stroke of the piston.

Since it is desired to operate the engine with a high degree of compression, it would require a considerable force to move the piston back in starting, and to relieve this pressure in starting the cock $f'$ is opened, so that some of the gas will flow from the inlet-passage $C'$ into the chamber $e'$, and thereby lessen the degree of the pressure during the back-stroke of the engine; but as soon as the engine is in operation the cock $f'$ is closed and thereafter the engine compresses its charge to a greater extent.

I provide all the convenient parts of the engine-frame, and particularly its base, with water-jackets, and connect the chamber of the latter with the cooling-jacket of the power-cylinder in such manner that the water will circulate from one to the other.

$W^2$ is a space for the cooling medium of the power-cylinder, and $W'$ $W'$ are the spaces of the frame, also filled with water. These spaces communicate by the wall-passage X, so that the water can flow from one to the other either by the natural flow or by any convenient means of providing a free circulation. The water will absorb the heat from the power-cylinder and give it up to the engine-frame, so that the latter will radiate it away, and thus the entire engine will be kept at a comparatively uniform and cool temperature. The piston is of the trunk form, and may have any suitable pitman-connection with the crank-shaft.

The compression-chamber F is preferably supplied with a combustible mixture by a mixing-valve, R, placed externally thereto, and adapted to automatically regulate the relative proportional supply of gas and air to the power-cylinder, so that the charge of combustible mixture shall be of uniform quality and density.

The fly-wheel of the engine has the governor device for governing the operation of the engine.

The engine on its upward stroke draws in a combustible mixture through the mixing-valve R into the compression-chamber F, wherein it is compressed by the downstroke of the piston until the latter arrives at the position shown in Figs. 1 and 2, in which the valve D has opened the ports $d$ $a$, so that the charge enters the combustion-chamber through the ports $c$ $e$ $d$ $a$, as shown by arrows, driving before it the waste gases through the exhaust-ports G. The piston now compresses the charge by the upward stroke, during which time the valve is in the position of Fig. 9, and the port $g$ is in communication with the external lighter-jet, $y$, at which time some of the charge passes through the passage $s$, Fig. 13, into the ignition-chamber $f$ with a tangential whirl and is ignited by the jet $y$. In this operation some of the gases flow back through the hole $h$ and pass out through the case-passages $m$ and $n$. This back passage for the gases is of importance in assisting the flame in passing through the port $g$, as it reduces the outward current through said port, and hence the flame is more easily transmitted from the external lighter to the chamber $f$. As the piston begins its next forward stroke, the valve moves into the position of Fig. 10, bringing the port $r$ into communication with the case-port $a$, so that the flame from the chamber $f$ is transmitted through the port $r$ to the charge.

I do not confine myself to the precise devices and combination of devices herein described, since any devices or combination of devices having the functions substantially of those described may be employed without departing from the spirit or scope of my invention.

It will be observed that the fresh gases entering the combustion cylinder or chamber drive before them and out of the exhaust-ports the foul gases remaining in the chamber after combustion has taken place. This is due to the fact that the entrance and exhaust ports are substantially at opposite ends of said chamber and are both open simultaneously for a short period of time. In engines of this type the exhaust-ports are usually opened by the piston in what may be termed its "forward stroke," and I find it convenient to employ this term to designate the type of engine illustrated and described.

Except for the purpose of the combination of devices hereinafter set forth in the claim, I do not in the Letters Patent to be issued on this application claim the herein-described method of operating a gas-engine, which consists in opening and maintaining without interruption a free communication between the combustion-chamber and a supplemental chamber during the first strokes of the piston at the starting of the engine, whereby to enlarge the compression and expansion area of said chamber, and subsequently closing and maintaining closed said communication while the engine is under way, as the said method constitutes the subject-matter of claim in an application for a patent filed by me February 14, 1888, under Serial No. 263,948, for improvement in method of operating gas-engines; nor do I claim the general construction of the engine herein shown and described, as such matter is the subject of claim in a patent granted to me July 17, 1888, and numbered 386,210.

I claim—

The combustion-chamber of a gas-engine supplemented with an external-valved communicating chamber placed between the charge-supplying port and the combustion-chamber for relieving the pressure in said chamber in starting the engine, in combination with a piston compressing the charge upon its back-stroke, as described.

LEWIS HALLOCK NASH.

Witnesses:
J. EDGAR BULL,
R. A. CORINALDI.